US006438538B1

(12) United States Patent
Goldring (10) Patent No.: US 6,438,538 B1
(45) Date of Patent: Aug. 20, 2002

(54) DATA REPLICATION IN DATA WAREHOUSING SCENARIOS

(75) Inventor: Robert David Goldring, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,945

(22) Filed: Oct. 7, 1999

(51) Int. Cl.[7] ............................................. G06F 17/30
(52) U.S. Cl. ................................. 707/3; 707/4
(58) Field of Search .......................... 707/3, 2, 1, 101, 707/102, 201, 202, 100, 4, 5

(56) References Cited

U.S. PATENT DOCUMENTS

| 5,675,785 A | 10/1997 | Hall et al. .................. 707/102 |
| 5,706,495 A | 1/1998 | Chadha et al. ................. 707/2 |
| 5,794,246 A | 8/1998 | Sankaran et al. ........... 707/101 |
| 5,848,405 A | 12/1998 | Norcott ......................... 707/1 |
| 5,870,746 A | 2/1999 | Kuntson et al. ............ 707/101 |
| 5,870,761 A | 2/1999 | Demers et al. ............. 707/201 |
| 5,884,328 A | 3/1999 | Mosher, Jr. ................. 707/202 |
| 6,029,163 A * | 2/2000 | Ziauddin ....................... 707/2 |
| 6,289,334 B1 * | 9/2001 | Reiner et al. .................. 707/3 |

FOREIGN PATENT DOCUMENTS

| WO | WO 98/09238 | 3/1998 | ........... G06F/17/30 |
| WO | WO 98/40804 | 9/1998 | ........... G06F/17/30 |

* cited by examiner

*Primary Examiner*—Sanjiv Shah
(74) *Attorney, Agent, or Firm*—Oppenheimer Wolff & Donnelly, LLP (57) ABSTRACT

A method, apparatus and program storage device for optimizing a query in a relational database management system is provided. The query including aggregate and grouping functions. An application table is preferably located in a source site and an aggregation operation is performed from a target site. After an initial aggregation operation performed from the source-based application table, the further aggregation operations are incrementally performed, by aggregating only the newly inputted relational database data into the target-based base aggregates table. This procedure allows the transformed query to perform more efficiently than the original query, while providing same results.

24 Claims, 2 Drawing Sheets

DATA REPLICATION IN DATA WAREHOUSING SCENARIOS

BACKGROUND OF THE INVENTION

1. Field of the Invention

This invention relates in general to database management systems performed by computers, and in particular to the optimized data replication technique utilizing incrementally maintained base aggregations of a dynamically increasing computer database, usable in data warehousing scenarios.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

In RDBMS software all data is externally structured into tables. The SQL interface allows users to formulate relational operations on the tables either interactively, in batch files, or embedded in host language, such as C, COBOL, etc. Operators are provided in SQL that allow the user to manipulate the data, wherein each operator operates on either one or two tables and produces a new table as a result. The power of SQL lies on its ability to link information from multiple tables or views together, to perform complex sets of procedures with a single statement.

One of the most common SQL queries executed by RDBMS software is the SELECT statement. In the SQL standard, the SELECT statement generally has the format: "SELECT <clause> FROM <clause> WHERE <clause> GROUP BY <clause> HAVING <clause> ORDER BY <clause>." The clauses generally must follow this sequence. Only the SELECT and FROM clauses are required and all other clauses are optional.

Generally, the result of a SELECT statement is a subset of data retrieved by the RDBMS software from one or more existing tables stored in the relational database, wherein the FROM clause identifies the name of the table or tables from which data is being selected. The subset of data is treated as a new table, termed the result table. The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause. The search condition typically comprises one or more predicates, each of which specifies a comparison between two values from certain columns, constants or correlated values. Multiple predicates in the WHERE clause are typically connected by Boolean operators.

The SELECT statement may also include a grouping function indicated by the GROUP BY clause. The GROUP BY clause causes the rows in the intermediate result set to be grouped according to the values specified in the clause. A number of column or aggregate functions are also built into SQL, such as MAX (maximum value in column), MIN (minimum value in column), AVG (average of values in column), SUM (sum of values in column), and COUNT (number of rows).

Queries using aggregate expressions return as many result rows as there exist unique "result groups" in the source of the aggregation. A result group is defined as the set of values contained in the fields of a row corresponding to the list of columns or expressions specified in the GROUP BY clause of the query. The value of the aggregate function is the cumulative result of applying the function to the result of the contained expression, for each row having the same result group.

A data warehouse is a subject-oriented, integrated, non-volatile, time-variant collection of data suited to the decision support needed at a certain network location of the enterprise data environment. For this purpose the IBM company created several replication products. One such product is named DataPropagator Relational Version 5.1, useable for AS/400 systems, having such features as efficient architecture for automatic capture and asynchronous propagation of data changes to DB2 databases, applicable for building data warehouses and creating client/server, distributed, or mobile applications. This product provides for automatic maintenance of consistent copies of relational data in the databases, and has a change-capture component that captures all application table changes. It utilizes subscription sets for transaction consistency, and supports full refresh and update change replication, update-anywhere replication, DB2 views-based replication, event-driven and continuous replication. Replication can help decrease batch workloads by replicating data in the background throughout the day.

Businesses today benefit from replicating data across a range of applications and business sites, to improve business cycle times and customer responsiveness. Frequently, these applications must share data with legacy applications on the host. Data replication can automatically deliver the shared data to the target platform, improving data availability and data access performance, and accommodating data restructuring and minimizing network load. This can improve employees' decision making capabilities. The decision-support databases assist in day-to-day decision-making activities, from determining what items to stock in various stores, to identifying customer sets for new products.

Data replication can improve application deployment and the existing application backlog can be reduced, since the majority of these applications are based on the relational model and use standard SQL. Data replication enables use of these applications by mapping, reformatting, and delivering data from legacy environments to relational databases elsewhere. In order to increase online throughput, replication supports off-load query processing to make room for increasing transaction processing requirements. Off-loading query processing reduces contention that impacts online transaction processing (OLTP) response time. Businesses are migrating applications from legacy systems or replicating data between multivendor environments. This reduces application development time and reduces application maintenance costs.

DataPropagator Relational, 5.1 provides read-only, update-anywhere, and on-demand replication between relational source and target processors. It consists of the following autonomous components and programs. Administration and replication control is performed by Control Center, Capture utility is used to capture changes made to data on replication sources, and Apply utility reads previously captured changed data and applies it to target tables.

The Control Center is used to define tables as sources, called replication sources, define target table definitions, called replication subscriptions, clone replication subscriptions to other servers and remove replication sources or subscriptions no longer needed. Whenever a replication request from the Control Center is submitted, such as a command defining a replication source, the processing information is generated as SQL statements. The statements may be run immediately, or saved in a file, which can be edited and the statements can be run at a later time from a replication folder object in the Control Center. Deferred SQL files let a user customize the replication tasks for his application needs.

The Capture component captures changes made to data in tables defined as replication sources by reading the database transaction log or journal, without making any changes to the sources, and is performed asynchronously to business applications using the same replication sources. The captured changes are placed in staging tables, with transaction detail stored separately in a Unit of Work (UOW) table.

The Apply component reads the changed data, previously captured and stored in a staging table, and applies it to the target tables. Apply components can also read data directly from source tables, for example, for a full refresh. Supporting update and refresh copying provides greater flexibility and automation in a replication environment. The Apply component also massages the data to user specifications, as it copies data to the targets. SQL statements can be prepared to create new columns, summarize data, translate data, join data and do other data transactions.

The Apply component allows the user to create read-only copies, user copy tables, which represent source data at a particular point in time, point-in-time tables, which represent source data at a particular point in time and some overhead columns, history tables, staging tables (which can be used as a source for further copies without recapturing changes, thus supporting a consistent data environment and providing flexibility in data distribution across the network), updatable copies, and replica tables. Updates to a replica table are automatically applied to the original source table of the replica, provided no conflicts are detected.

The Apply component, running at the replica site, detects update conflicts after they occur during the subscription cycle. An Apply instance can process many subscriptions at a single site. Multiple Apply instances can run concurrently at different sites/platforms, each processing different numbers and types of subscriptions from the same source. Each subscription can have different definitions, refresh criteria, and timing.

The performance of aggregate or grouping functions is a key factor in any database system performance, since in many applications more than 70% of the queries perform these functions. Thus, improvements in the performance of aggregation or grouping instructions lead directly to significant improvements in application workloads.

One problem associated with data warehouses involves aggregating the extremely large amounts of data stored within application databases with the frequent input of large amounts of data. By aggregating the data stored within the data warehouse with newly inputted data, the raw data is translated into the most current meaningful information that can be relied upon by decision makers, which should have the most up-to-date and current information. However, the aggregation takes a long time to perform and overwhelms the application processor, because in the conventional systems all the pertinent data stored within the data warehouse is re-aggregated along with the newly inputted data.

While there have been various techniques developed for optimizing the performance of SQL statements, there is a need in the art for optimization techniques involving aggregate expressions and grouping clauses. Therefore, it would be advantageous to provide a method for the computer that accesses data warehouse databases to be able to easily aggregate sets of data stored within them. The present invention provides this advantage, by aggregating only the newly inputted and changed data into the aggregate table. The aggregate table thus has the most current information without having to continuously access and re-aggregate all the pertinent data, stored within the data warehouse, along with the newly inputted data.

SUMMARY OF THE INVENTION

The foregoing and other objects, features, and advantages of the present invention will be apparent from the following detailed description of the preferred embodiments, which makes reference to several drawing figures.

One preferred embodiment of the present invention includes a method of optimizing a query in a computer system, in which data is retrieved from a dynamically increasing relational database stored in an electronic storage device coupled to the computer system. The method includes the steps of: analyzing the query in the computer system to determine whether the query includes an aggregate operation; and performing aggregate operations in the computer system, by incrementally aggregating only the newly inputted relational database data into a base aggregates table, thereby updating the base aggregates table with the most current information without having to re-aggregate the relational database.

The aggregation operation may have one or more functions selected from AVERAGE (AVG), COUNT and SUM functions. The query may have at least one arithmetically adjustable SQL column function, such as AVERAGE (AVG), COUNT and SUM, and other columns which are referenced in a GROUP BY clause.

The step of incrementally performing aggregate operation includes initializing the base aggregates table by executing the query against the relational database. Then, the newly inputted relational database data may be aggregated into an intermediate table, and the base aggregates table may be re-aggregated using the intermediate table data.

The present invention may be performed in a network-based computer system, having at least a source site and a target site. In that case the step of incrementally performing aggregate operations is performed at the target site. Moreover, the source site has the relational database, and the target site has the base aggregates table, and may also have the intermediate table, if used.

The base aggregates table may include a row birth timestamp, set when a row is inserted into the base aggregate table, and an end timestamp, either having a commit time of the last transaction modifying the base aggregate table or a commit time of the last transaction modifying the base aggregate table row.

Another preferred embodiment of the present invention is a computer system for optimizing a query, utilizing the above-described method embodiment of the present invention.

Yet another preferred embodiment of the present invention is a program storage device readable by a computer tangibly embodying a program of instructions executable by the computer to perform the above-mentioned method embodiment of the present invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized and structural and functional changes may be made without departing from the scope of the present invention.

The present invention discloses a method, apparatus and program storage device for optimizing the performance of SQL statements, including aggregate expressions and grouping clauses. The optimized data replication technique utilizes incrementally maintained base aggregations of a dynamically increasing computer database, by aggregating only the newly inputted and changed data into the base aggregate table, thus obtaining the aggregate table with the most current information, without having to continuously access and re-aggregate all the pertinent data stored within the data warehouse along with the newly inputted data.

Figure 1:
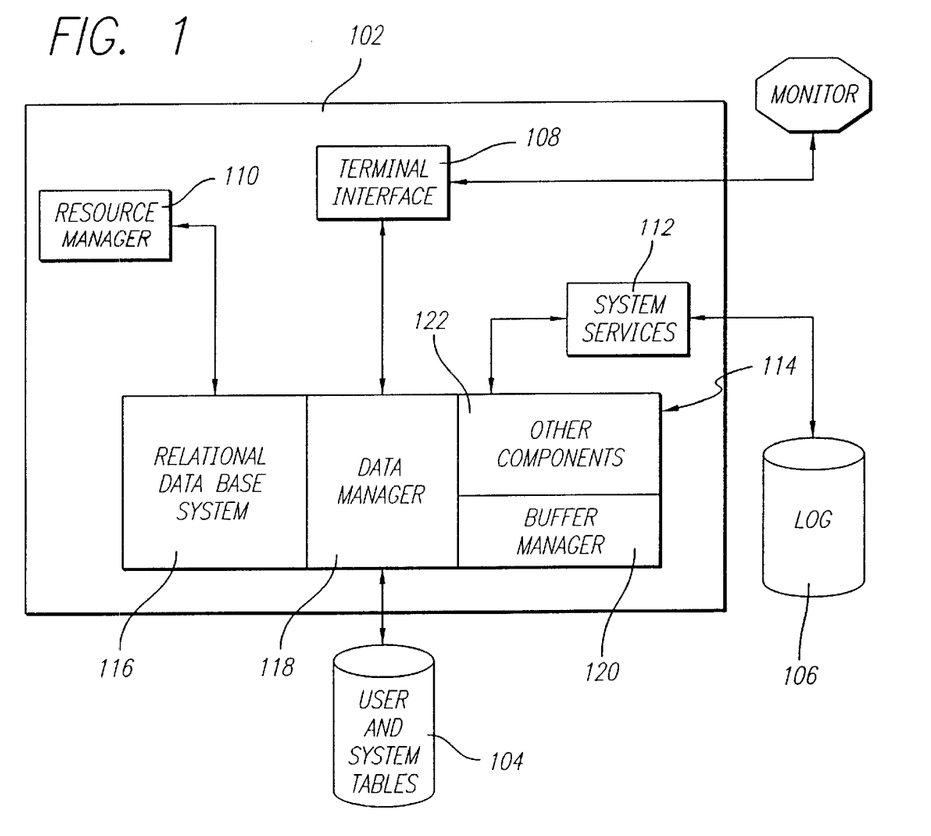
FIG. 1 illustrates a computer hardware and software environment usable in the present invention.

FIG. 1 illustrates an exemplary computer hardware environment, including a computer system 102 comprised of one or more processors executing instructions stored in its associated computer memory, that could be used with the present invention. The operating memory can be loaded with the instructions received through an optional storage drive or through an interface with the network. In one exemplary environment, the replication technique of the present invention is utilized on the same processor site where the application table is stored. However, the technique is especially advantageous when used in a network environment, having at least a source site with a source processor networked to a target site with a target processor.

Each processor is connected to one or more electronic storage devices 104 and 106, such as disk drives, that store one or more relational databases. These drives may comprise, for example, optical disk drives, magnetic tapes and/or semiconductor memory. The storage drive permits receipt of a program storage device, such as a magnetic media diskette, magnetic tape, optical disk, semiconductor memory and other machine-readable storage device, and for program steps recorded on the program storage device to be read and transferred into the computer memory. The recorded program instructions may include the code for the optimized replication technique of the present invention. Alternatively, the program steps can be received into the operating memory or over the network.

Operators of the computer system 102 use a standard operator terminal interface 108, such as IMS/DB/DC, CICS, TSO, OS/2 or other similar interface, to transmit electrical signals to and from the computer system 102, that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the OS390 or OS/2 operating systems. Those skilled in the art will recognize, however, that the present invention has application to any RDBMS software that uses SQL, and may similarly be applied to non-SQL queries.

As illustrated in FIG. 1 the DB2 architecture for the OS390 operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets on the electronic storage device 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122, such as an SQL compiler/interpreter. These submodules support the functions of the SQL language, i.e., definition, access control, retrieval, and update of user and system data. The Database Services module 114 preferably comprises one or more processors that execute a series of computer-executable programming instructions to respond to a user query.

The replication technique of the preferred embodiments of the present invention may be utilized on the same processor site where the application table is stored. However, the technique is especially advantageous when used in a network environment. In a network environment the source site has the application table and the target site is the remote site where the base aggregations are needed. In this case the present invention maintains rapid and timely remote aggregations, minimizes the load on the network to initialize and maintain the remote aggregations, and minimizes impact to source-site transaction processing while concurrently maintaining remote aggregations. The present invention works with any of the heterogeneous sources supported by IBM DataPropagator Relational (DPropR) product, such as IMS, DB2 for VM/VSE, DB2 for OS/390, DB2 for AS/400, DB2 Common Server, DB2 Universal Database, Oracle, Informix, Sybase, SQL Anywhere, and Microsoft SQL Server, and other relational and non-relational products.

The preferred embodiments of the present invention utilize the optimized replication technique wherein a base aggregates table is incrementally adjusted with the newly inputted data, to provide results superior to the results that can be presently achieved using DataPropagator's built-in replication technique, presently only utilizing the base aggregate feature. Although the terms base aggregate, change aggregate and Apply program, etc., used in this document are specific to DpropR product, the invention can be practiced with many other, non-IBM products.

A base aggregate is the stored result of a query against an application table, typically located on a source site. The query may contain one or more SQL column functions, and other columns which are referenced in a GROUP BY clause. Since base aggregates summarize data over the whole application table, they are relatively costly to maintain. Presently, the queries, which the DPropR Apply program of the DPropR product uses to maintain a base aggregate, range over a whole application table, which may be very large, possibly resulting in contention with updating transactions on the application table.

The replication query to be optimized by the preferred embodiment of the present invention contains one or more SQL column functions and other columns which are referenced in a GROUP BY clause. In the present invention, after the initialization, the aggregation is performed incrementally against the change data tables, and not against the application table. Preferably, each change aggregate is immediately stored into the base aggregates table. It is also possible, as shown in the SQL Script described below, to use a change aggregates table for temporary storage of the query result. Although this document describes the change aggregate table, it should be noted that it is preferable to store each change aggregate immediately into the base aggregates table, and to avoid use of any intermediate table, such as the change aggregates table.

Change aggregates have very good performance characteristics. The queries to maintain them are redirected away from the application tables to change data tables. Not only does this avoid contention with the OLTP workload, but, since change data tables are much smaller than the application tables, the change aggregate queries run quickly. Change aggregates are useful for trend analysis, to tell where the business is going, since they summarize recent activity. However, they do not summarize the overall state of the data in the application table, which shows the state of the business enterprise. Therefore, at the end of the cycle of the optimized replication technique of the present invention, the content of the change aggregates table is incorporated into the base aggregates table to adjust it for newly entered values, which shows the state of the business enterprise.

Base aggregates and change aggregates share many of the same favorable characteristics with respect to network and target DBMS costs: the queries used to maintain aggregates produce small answer sets at the source server which has the application table, so that less data goes on the network, keeping utilization of the source-to-target link low. The small answer set also keeps communication overhead low at the target system, and keeps the number of SQL statements needed to maintain the copies low.

One of the performance issues associated with maintenance of conventional base aggregates is the cost of the source site query which re-computes the SQL column functions over the application tables each time new data is acquired. With the present invention this cost factor is so decreased, that it is feasible to maintain base aggregates, even when located at remote sites, every few minutes or even seconds. If the user is also copying detail data to a remote site, the base aggregates may be maintained by the same subscription set propagating the detail records, thus maintaining transaction consistency between the base aggregates and other types of copies, which is not presently possible using the DpropR product.

The preferred embodiment of the present invention is shown on an example of inventory aggregation, implemented in the SQL Script, shown below. The SQL Script includes a sequence of SQL statements or DB2 commands, which can be scheduled using the Apply program. Using these SQL script commands, the Appy program may generate queries and other commands. The example incrementally adjusts part quantity summations, from transactions propagating in from multiple warehouses, in a single, global aggregation. The base aggregate table obtained by this example is the equivalent of the result obtained with the base aggregation feature of the DPropR product. However, here the user may have less computer system capacity or needs quicker updates, and would prefer the remote aggregation to be incrementally adjusted as the source application table changes are captured.

The example is based on the following application table:
INVENTORY(
WAREHOUSE INT NOT NULL,
PARTNUM INT NOT NULL,
QTY INT NOT NULL,
PRIMARY KEY (WAREHOUSE, PARTNUM))
An insert into this table illustrates that a warehouse WAREHOUSE, which previously did not carry inventory of part number PARTNUM, recently inventoried QTY units of this part. A delete from this table illustrates a reduction of all inventory of part PARTNUM in the warehouse WAREHOUSE. An update to a row in this table sets the value of QTY to reflect the current inventory of part PARTNUM in the warehouse WAREHOUSE.

The key columns, WAREHOUSE and PARTNUM, are thought invariant; i.e. never updated. The base aggregate uses PARTNUM as a key to count distinct warehouse values. However, if user's applications update these columns, in order to capture the changes, the PARTITION_KEYS_CHG='Y' option should be utilized so that all updates are captured as a delete operation followed by an insert operation.

In this example the base aggregate copy maintains the following result:
SELECT PARTNUM,
COUNT(*) AS COUNT_WH,
SUM(QTY) AS SUM_QTY,
AVG(QTY) AS AVG_QTY
FROM INVENTORY
GROUP BY PARTNUM
The base aggregates table is created by the following instruction:
CREATE TABLE GOLDRING.AGGREGATES(
PARTNUM INT NOT NULL,
COUNT_WH INT,
SUM_QTY INT,
AVG_QTY INT,
IBMSNAP_HLOGMARKER TIMESTAMP NOT NULL,
IBMSNAP_LLOGMARKER TIMESTAMP NOT NULL)
  IN USERSPACE1;
The two timestamp columns, IBMSNAP_LLOGMARKER and IBMSNAP_HLOGMARKER, are automatically maintained by the Apply program for the subscription member. Unlike in the conventional base aggregates, the values of IBMSNAP_LLOGMARKER and IBMSNAP_HLOGMARKER timestamps diverge in this example. The IBMSNAP_LLOGMARKER value is set, when the row is inserted into the base aggregate, by either subscription set SETNAME1 or subscription set SETNAME2. IBMSNAP_LLOGMARKER is thus the birth timestamp for the row in the base aggregates table.

IBMSNAP_HLOGMARKER timestamp moves forward in every row of the base aggregate with each SETNAME2 subscription cycle, regardless of whether an inventory change occurred for that particular part PARTNUM or not. IBMSNAP_HLOGMARKER thus reflects the commit time of the last transaction that changed any inventory information. IBMSNAP_HLOGMARKER could be, instead, defined to be specific to transactions affecting individual PARTNUM aggregations. In this case the SQL-after UPDATE statement should include a matching predicate, in place of the MAX(IBMSNAP_HLOGMARKER) reference.

The SQL Script example shown herein includes use of the standard SQL column functions AVG, COUNT and SUM, explicitly excepting the MIN and MAX functions. It is not possible to use the optimized replication technique of the present invention to maintain MIN and MAX values incrementally from the change aggregates table, because these values are not arithmetically adjustable and they must always be recalculated from a complete set of non-aggregated rows. Since they need to be replaced with the most highest or most lowest value from the source table, MIN and MAX queries have to run against the source table directly.

Figure 2:
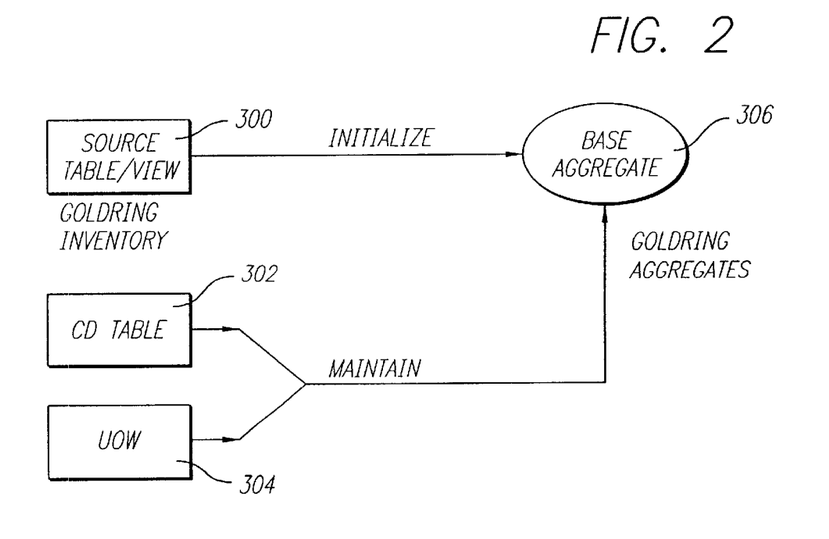
FIG. 2 illustrates an exemplary computer database environment that could be used according to one preferred embodiment of the present invention.

FIG. 2 illustrates an exemplary computer database environment that could be used with the present invention. A computer system is comprised of one or more processors, such as the system shown in FIG. 1. Multiple processors may be interconnected by a network. Processors are coupled to one or more data storage units that store one or more relational databases, such as an application table 300. In the network environment the application table 300 is located on the same system site, preferably a source site, with a Change Data (CD) table 302 and a Unit of Work (UOW) table 304. The change data table 302 may be of a Consistent Change Data (CCD) table type, in which both columns and rows may be subset.

The present invention is embodied in the RDBMS computer program, such as the DpropR product, executed by the computer system. The CD table 302 and the UOW table 304 are preferably obtained with the Capture component of the DpropR product, but can be made by any utility which captures changes, introduced via commands INSERT, UPDATE and DELETE, made to data in the application table(s) 300, defined as replication sources, by reading the database transaction log or journal.

Figure 3:
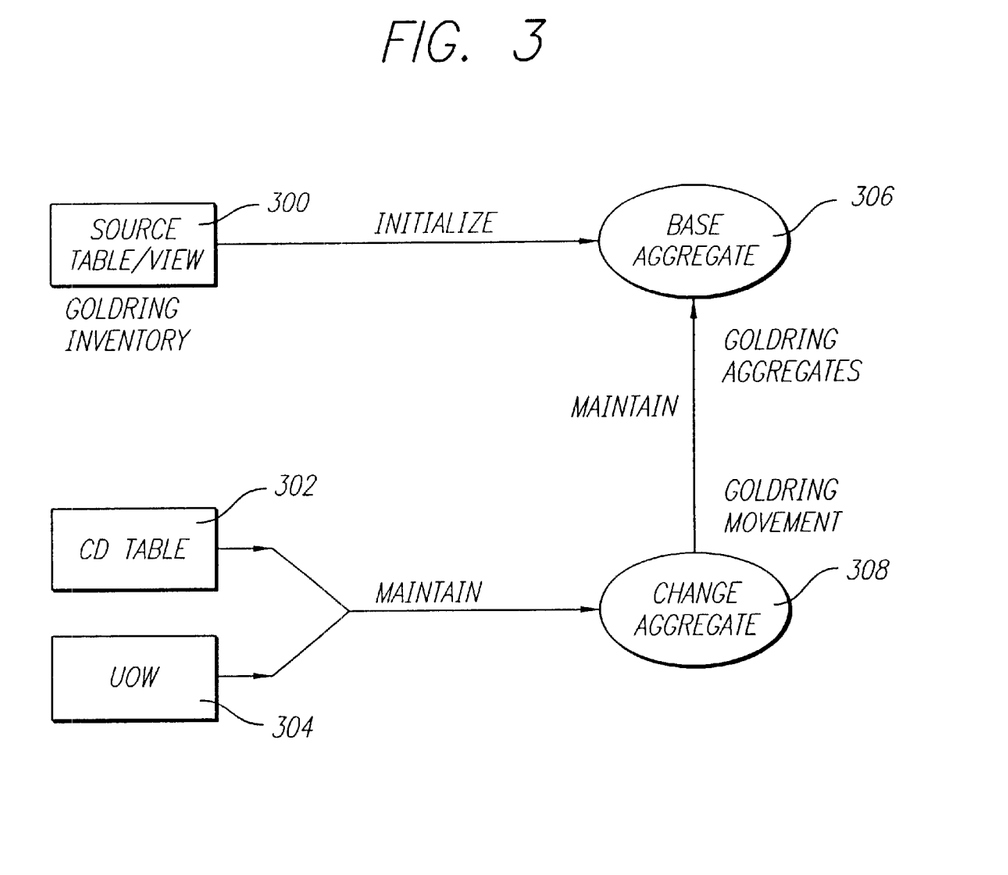
FIG. 3 illustrates an exemplary computer database environment that could be used according to another preferred embodiment of the present invention.

In the optimized replication technique of the present invention a base aggregates table 306, named AGGREGATES table, is incrementally adjusted with the newly inputted data. An intermediate table, a change aggregates table 308, named MOVEMENT table, can be used to accumulate the change aggregates before they are implemented into the base aggregates table 306, as shown in FIG. 3. In a network environment the aggregates table(s) are located on a target site. The base aggregate subscription SETNAME1 runs only once, during the initialization, to refresh data in the base aggregates table 306 with the data from the whole application table 300. Then the change aggregate subscription takes over.

Changes are received from the CD table 302 and UOW table 304 are either pre-aggregated into the change aggregates table 308, or immediately aggregated into the base aggregates table 306. Preferably it is accomplished by the Apply program. The SQL Script defines the activated change aggregate subscription SETNAME2 for the Apply program. The Apply component of the DpropR product, invoked on the target site, is used to read the changed data, previously captured and stored in the change data table 302 and the UOW table 304, and apply the data to the target base aggregates table 306 and change aggregates table 308, thus building a row containing the results from the specified aggregate function, i.e., SUM, COUNT and AVERAGE, for the scanned rows. At the end of each subscription cycle, if there was pre-aggregation into the intermediate change aggregates table 308, this information is used to adjust and maintain the base aggregates table 306. Since the rows in the change aggregates table 308 contain the aggregate result rows and could be having multiple rows for the same result group, these duplicates are coalesced to create a single aggregate result row for each result group.

Thus, the Apply routine is used to direct the target server to receive an aggregation of the changed rows, received from the CD table 302 and UOW table 304, which contain group identifiers and corresponding data values, such as quantity of items in the group. The function that could be performed by the server on the group identifier and corresponding data values is an insert, update or delete function. These functions direct the target server to propagate the change located within the data of the input row into the target base aggregates table 306.

The SQL script illustrates how a base aggregate subscription SETNAME1 is defined, to direct the Apply program on the target server to run a base aggregation just once, at initialization time. As the SQL script for this example illustrates, the cost of a base aggregate subscription is minimized by turning the standard base aggregate feature of the DpropR product off, after the first run to obtain a refreshed base aggregate copy from the source application table 300. Upon completion of the refresh instruction, the subscription SETNAME1 activates the change aggregate subscription SETNAME2, which then deactivates the SETNAME1.

SETNAME2 maintains both the change aggregate and the base aggregate copies. Preferably, as shown in this example, the change aggregate is maintained by a subscription member definition, while the base aggregate is maintained with SQL-after statements, which refer to the change aggregate. In this invention the subscription control tables must be located in the same database and on the same server as the MOVEMENT and AGGREGATES tables, because SQL-after statements refer to all these tables. Since the SQL-after statements preferably run at the target server, these databases should be located there, too.

With subscription sets, updates to all related target tables are committed in a single unit of work, supporting referential integrity requirements. Run-time processing statements can be defined using SQL statements, and these individual statements or stored procedures can be run before and/or after the Apply program processes the replication subscription. The run-time processing statements can be run at the source server, before the answer set is retrieved, and at the target server, before and after the answer set is applied.

The present invention reduces the application table contention and source processor utilization time. It may extend replication to multivendor sources and targets, including Oracle, Sybase, Informix, Microsoft SQL Server, and others. It may be used with DataJoiner component of the DpropR product, which is a multidatabase server that provides a single-site image to all data, relational and non-relational, local and remote, from IBM and non-IBM platforms, as though the data were local. DataJoiner masks differences in SQL dialects, data access methods, networking protocols, and operating systems. In the context of replication, DataJoiner provides the gateway to heterogeneous environments.

The SQL Script example defines only one base aggregates table and one change aggregates table. However, since an Apply instance can process many subscriptions at a single site, the preferred embodiments of the present invention may handle subscriptions with an arbitrary number of members and SQL statements, so that multiple aggregates can be maintained with transaction consistency, when included in the same subscription set. Multiple Apply instances can run concurrently at different sites/platforms, each processing different numbers and types of subscriptions from the same source. Each subscription can have different definitions, refresh criteria, and timing.

The SQL-after statements used to adjust the base aggregates table are complex, but since they do not reference detail data the costs are reasonable, and when they run on the target system the costs are borne by the target system.

In the present invention the work of maintaining the base aggregate copy is split in the subscription between the change aggregate member definition and the SQL-after statements. The balance of work done in either part of the subscription is a matter of choice. In the SQL Script example much of the work, such as negating the QTY amounts for deleted rows and calculating differences in QTY values for updated rows, is shifted to the change aggregate subscription member. By doing some of the adjustments in the subscription member processing, the SQL-after statements can be simpler, because they do not require logic specific to the type of original insert, update or delete operations, performed herein by the subscription member processing.

With the optimized replication technique of the present invention all the transaction detail does not have to be sent from the source site to the remote site and maintained there. Further, the preferred embodiments may be used without contending for the OLTP source application tables to recalculate the aggregations, and with the potential for near-real-time recalculation and replication. Moreover, with this invention the complete set of rows never needs to be fetched over the network or stored at the target site.

Replication queries to the source site always contain SQL column functions, minimizing the size of the answer sets returned. Except for the initialization of the base aggregates table, all subsequent replication queries to the source site avoid the application tables. This allows the target change aggregates table and the base aggregates table to be maintained according to any schedule user prefers, without contending with the source site transactions. Further, the replication queries against the source application table use simple SQL which is common to all supported replication sources.

The following SQL Script includes commented lines for better understanding of the script instructions.

```
CONNECT TO SOURCE1;

CREATE TABLE GOLDRING.INVENTORY(
WAREHOUSE INT NOT NULL,
PARTNUM INT NOT NULL,
QTY INT NOT NULL,
PRIMARY KEY(WAREHOUSE, PARTNUM))
IN USERSPACE1 DATA CAPTURE CHANGES;

CREATE UNIQUE INDEX INVENTORYX ON
   GOLDRING.INVENTORY(WAREHOUSE
ASC, PARTNUM ASC)

-- Be sure to register the above table with XQTY as a
   before-image column
-- create the cd/ccd table for GOLDRING.INVENTORY
CREATE TABLE GOLDRING.INVENTORY_CD
   (IBMSNAP_UOWID CHAR(10) FOR
BIT DATA NOT NULL,IBMSNAP_INTENTSEQ CHAR
   (10) FOR BIT DATA NOT NULL,
IBMSNAP_OPERATION CHAR(1) NOT NULL,
   WAREHOUSE INTEGER NOT NULL,
PARTNUM INTEGER NOT NULL,QTY
INTEGER NOT NULL,XQTY INTEGER) IN USER-
   SPACE1;

-- create the index for the change data table for
   GOLDRING.INVENTORY_CD
CREATE UNIQUE INDEX GOLDRING.INVENTORY_
   CDX ON
GOLDRING.INVENTORY_CD(IBMSNAP_UOWID
   ASC, IBMSNAP_INTENTSEQ ASC);

-- insert a registration record into ASN.IBMSNAP_
   REGISTER
INSERT INTO ASN.IBMSNAP_REGISTER(GLOBAL_
   RECORD,SOURCE_OWNER,
SOURCE_TABLE,SOURCE_VIEW_QUAL,SOURCE_
   STRUCTURE,SOURCE_CONDENSE
D,
SOURCE_COMPLETE,CD_OWNER,CD_TABLE,
   PHYS_CHANGE_OWNER,PHYS_CHAN
GE_TABLE,
DISABLE_REFRESH,ARCH_LEVEL,BEFORE_IMG_
   PREFIX,CONFLICT_LEVEL,
PARTITION_KEYS_CHG) VALUES('N','GOLDRING',
   'INVENTORY', 0 , 1 ,'Y',
'Y','GOLDRING','INVENTORY_CD','GOLDRING',
   'INVENTORY_CD', 0
,'0201','X','0','N');

COMMIT;
CONNECT TO TARGET1;

CREATE TABLE GOLDRING.MOVEMENT(
PARTNUM INT NOT NULL,
DIFFERENCE_WH INT NOT NULL,
IBMSNAP_OPERATION CHAR(1) NOT NULL,
DIFFERENCE_QTY INT NOT NULL,
IBMSNAP_HLOGMARKER TIMESTAMP NOT NULL,
IBMSNAP_LLOGMARKER TIMESTAMP NOT NULL)
   IN USERSPACE1;
-- Note: The IBMSNAP_OPERATION column above is not
   referenced when updating the
-- GOLDRING.AGGREGATES table. Rather, having the
   value in the
GOLDRING.MOVEMENT
-- table more clearly shows the intermediate aggregations,
   and how to
-- interpret the subsequent COUNT_WH adjustments.

-- Create an index for the TARGET GOLDRING.MOVE-
   MENT
CREATE INDEX MOVEMENTX ON
   GOLDRING.MOVEMENT(
PARTNUM ASC);

CREATE TABLE GOLDRING.AGGREGATES(
PARTNUM INT NOT NULL,
COUNT_WH INT,
SUM_QTY INT,
AVG_QTY INT,
IBMSNAP_HLOGMARKER TIMESTAMP NOT NULL,
IBMSNAP_LLOGMARKER TIMESTAMP NOT NULL)
   IN USERSPACE1;

-- Create an index for the TARGET GOLDRING.AGGRE-
   GATES
CREATE UNIQUE INDEX AGGREGATESX ON
   GOLDRING.AGGREGATES(PARTNUM
ASC);
```

```
-- As a 'union' must be simulated, and
-- DB2 for OS/390 disallows unions in views,
-- multiple subscription members are be used, requiring
   target views to
-- differentiate the separate members copying insert, update,
   delete
-- operations.

CREATE VIEW TRGVIEWI.MOVEMENT AS SELECT *
   FROM GOLDRING.MOVEMENT;
CREATE VIEW TRGVIEWU.MOVEMENT AS SELECT
   * FROM
GOLDRING.MOVEMENT;
CREATE VIEW TRGVIEWD.MOVEMENT AS SELECT
   * FROM
GOLDRING.MOVEMENT;

-- create a new row in IBMSNAP_SUBS_SET
-- for the base aggregate "AGGREGATES" subscription
INSERT INTO ASN.IBMSNAP_SUBS_SET(
   ACTIVATE,APPLY_QUAL,SET_NAME,
WHOS_ON_FIRST,SOURCE_SERVER,SOURCE_
   ALIAS,TARGET_SERVER,TARGET_AL
IAS,
STATUS,LASTRUN,REFRESH_TIMING,SLEEP_
   MINUTES,EVENT_NAME,
MAX_SYNCH_MINUTES,AUX_STMTS,ARCH_
   LEVEL) VALUES (1 , 'APPLY QUAL1' ,
'SET_NAME1' , 'S' , 'SOURCE1' , 'SOURCE1' ,
   'TARGET1' , 'TARGET1' , 0 ,
'1999-01-05-19.19.00' , 'R' , 1 ,NULL, 15, 0 ,'0201');

-- create a new row in IBMSNAP_SUBS SET
-- for the change aggregate "MOVEMENT" subscription
INSERT INTO ASN.IBMSNAP_SUBS_SET(
   ACTIVATE,APPLY_QUAL,SET_NAME,
WHOS_ON_FIRST,SOURCE_SERVER,SOURCE_
   ALIAS,TARGET_SERVER,TARGET_AL
IAS,
STATUS,LASTRUN,REFRESH_TIMING,SLEEP_
   MINUTES,EVENT_NAME,
MAX_SYNCH_MINUTES,AUX_STMTS,ARCH_
   LEVEL) VALUES (0 , 'APPLY_QUAL1' ,
'SET_NAME2' , 'S' , 'SOURCE1' , 'SOURCE1' ,
   'TARGET1' , 'TARGET1' , 0 ,
'1999-01-05-19.19.00' , 'R' , 1 ,NULL, 15 , 0 , '0201');

-- the BASE AGGREGATE

-- create a new row in IBMSNAP_SUBS_MEMBR

INSERT INTO ASN.IBMSNAP_SUBS_MEMBR(
APPLY QUAL,SET_NAME,WHOS_ON_FIRST,
SOURCE_OWNER,SOURCE_TABLE,SOURCE_
   VIEW_QUAL,TARGET_OWNER,TARGE
T_TABLE,
TARGET_CONDENSED,TARGET_COMPLETE,
   TARGET_STRUCTURE,PREDICATES)
VALUES ('APPLY_QUAL1' , 'SET_NAME1' , 'S' ,
   'GOLDRING' , 'INVENTORY' , 0 ,
'GOLDRING','AGGREGATES','A','N', 5 ,'1=1 GROUP
   BY PARTNUM');
-- The dummy predicate above, 1=1, can be substituted with
   a real -- filtering predicate. The aggregate subscription requires a
-- predicate of some kind preceding the GROUP BY clause.

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME1' , 'S',
   'GOLDRING','AGGREGATES' ,'F',
'COUNT_WH','N', 1 ,'COUNT(*)');
-- Count the number of warehouses which inventory this part -- Create a new row in IBMSNAP_SUBS_COLS
INSERT INTO
ASN.IBMSNAP_SUBS COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME1' , 'S',
   'GOLDRING','AGGREGATES' ,'A',
'PARTNUM','N', 2 ,'PARTNUM');

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET NAME,IS_KEY,COLNO,EXP
RESSION)
VALUES('APPLY_QUAL1','SET_NAME1' , 'S',
   'GOLDRING','AGGREGATES' ,'F',
'SUM_QTY','N', 3 ,'SUM(QTY)');

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME1' , 'S',
   'GOLDRING','AGGREGATES' ,'F',
'AVG_QTY','N', 4 ,'AVG(QTY)');

-- the IBMSNAP_LLOGMARKER and IBMSNAP_
   HLOGMARKER columns will be
-- automatically maintained by the Apply process -- Add an SQL-before statement to remove all rows from the
   AGGREGATES
-- table, just in case this is a re-run and the table is not empty.
--
-- create a new row in IBMSNAP_SUBS_STMTS
INSERT INTO
ASN.IBMSNAP_SUBS_STMTS(APPL_QUAL,SET_
   NAME,WHOS_ON_FIRST,
BEFORE_OR_AFTER,STMT_NUMBER,EI_OR_
   CALL,SQL_STMT,ACCEPT_SQLSTATES
)
VALUES('APPLY_QUAL1','SET_NAME1','S','B', 1
   ,'E',
'DELETE FROM GOLDRING.AGGREGATES',
   '0000002000');
-- If these old rows are not removed from the MOVEMENT
   table before the
```

```
-- SQL-after statements run again, they will be double-
   counted
-- in the AGGREGATES table.

-- add an SQL-after statement to turn on the MOVEMENT
   subscription
--
-- create a new row in IBMSNAP_SUBS_STMTS
INSERT INTO
   ASN.IBMSNAP_SUBS_STMTS(APPLY_QUAL,SET_
   NAME,WHOS_ON_FIRST,
   BEFORE_OR_AFTER,STMT_NUMBER,EI_OR_
   CALL,SQL_STMT)
VALUES('APPLY_QUAL1','SET_NAME1','S','A', 2
   ,'E','UPDATE
ASN.IBMSNAP_SUBS_SET SET ACTIVATE=1
   WHERE
APPLY QUAL="APPLY_QUAL1"
AND SET_NAME="SET_NAME2" AND WHOS_ON_
   FIRST="S"');
--
-- Add an SQL-after statement to turn off the AGGRE-
   GATES subscription
-- once it has completed successfully
-- attach this to the MOVEMENT subscription, so that the
   AGGREGATES
-- subscription will not be self-modifying.
-- Older levels of Apply code did not allow a subscription to
   modify
-- its own ACTIVATE value.
--
-- create a new row in IBMSNAP_SUBS_STMTS
INSERT INTO
   ASN.IBMSNAP_SUBS_STMTS(APPLY_QUAL,SET_
   NAME,WHOS_ON_FIRST,
   BEFORE_OR_AFTER,STMT_NUMBER,EI_OR_
   CALL,SQL_STMT)
VALUES('APPLY_QUAL1','SET_NAME2','S','A', 3
   ,'E','UPDATE
ASN.IBMSNAP_SUBS_SET SET ACTIVATE=0
   WHERE
APPLY_QUAL="APPLY_QUAL1"
AND SET_NAME="SET_NAME1" AND WHOS_ON_
   FIRST="S"');

-- increment the AUX_STMTS counter in IBMSNAP_
   SUBS_SET
UPDATE ASN.IBMSNAP_SUBS_SET SET AUX_
   STMTS=AUX_STMTS + 2 WHERE
APPLY_QUAL='APPLY_QUAL1' AND SET_NAME=
   'SET_NAME1' AND
WHOS_ON_FIRST='S';

-- increment the AUX_STMTS counter in IBMSNAP_
   SUBS_SET
UPDATE ASN.IBMSNAP_SUBS_SET SET AUX_
   STMTS=AUX_STMTS + 1 WHERE
APPLY_QUAL='APPLY_QUAL1' AND SET_NAME=
   'SET_NAME2' AND
WHOS_ON_FIRST='S';

-- the CHANGE AGGREGATE

-- create a new row in IBMSNAP_SUBS_MEMBR
-- to fetch insert operations from the source CD table into
   view TRGVIEWI.MOVEMENT INSERT INTO ASN.IBMSNAP_SUBS_MEMBR(
APPLY_QUAL,SET_NAME,WHOS_ON_FIRST,
SOURCE_OWNER,SOURCE_TABLE,SOURCE_
   VIEW_QUAL,TARGET_OWNER,TARGE
T_TABLE,
TARGET_CONDENSED,TARGET_COMPLETE,
   TARGET_STRUCTURE,PREDICATES)
VALUES(
'APPLY_QUAL1' , 'SET_NAME2' , 'S' , 'GOLDRING'
   , 'INVENTORY' , 0 ,
'TRGVIEWI','MOVEMENT','A','N', 6 ,
'IBMSNAP_OPERATION="I"' GROUP BY PARTNUM,
   IBMSNAP_OPERATION');
-- Note that this member just fetches the aggregated inserts.

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWI','MOVEMENT' ,'F',
'DIFFERENCE_WH','N', 1 ,'COUNT(*)');

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWI','MOVEMENT' ,'A',
'PARTNUM','N', 2 ,'PARTNUM');

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWI','MOVEMENT' ,'F',
'DIFFERENCE_QTY','N', 3 ,'SUM(QTY)');

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWI','MOVEMENT' ,'A',
'IBMSNAP_OPERATION','N', 4 ,'IBMSNAP_
   OPERATION');

-- create a new row in IBMSNAP_SUBS_MEMBR
-- to fetch update operations from the source CD table into
   view TRGVIEWU.MOVEMENT INSERT INTO ASN.IBMSNAP_SUBS_MEMBR(
APPLY_QUAL,SET_NAME,WHOS_ON_FIRST,
SOURCE_OWNER,SOURCE_TABLE,SOURCE_
   VIEW_QUAL,TARGET_OWNER,TARGE
```

```
T_TABLE,
TARGET_CONDENSED,TARGET_COMPLETE,
   TARGET_STRUCTURE,PREDICATES)
VALUES (
'APPLY_QUAL1','SET_NAME2', 'S', 'GOLDRING',
   'INVENTORY', 0,
'TRGVIEWU','MOVEMENT','A','N', 6,
'IBMSNAP_OPERATION="U" GROUP BY PARTNUM,
   IBMSNAP_OPERATION');
-- Note that this member just fetches the aggregated updates.

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWU','MOVEMENT' ,'C',
'DIFFERENCE_WH','N', 1 ,'0');
-- Because these are updates, the DIFFERENCE_WH value
   is fetched as a
-- zero (0) constant, because there is no new warehouse+
   partnum key inserted,
-- and no warehouse+partnum key deleted.

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWU','MOVEMENT' ,'A',
'PARTNUM','N', 2 ,'PARTNUM');

-- Create a new row in IBMSNAP_SUBS_COLS
INSERT INTO
ASN.IBMSNAP_SUBS_COLS(APPL_QUAL,SET_
   NAME,WHOS ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWU','MOVEMENT' ,'F',
'DIFFERENCE_QTY','N', 3 ,'SUM(QTY)-SUM(XQ
   TY)');
-- Because this is an update, DIFFERENCE_QTY is cal-
   culated by
-- substracting the before-image sum from the after-image
   sum.
-- One row will be fetched for each partnum updated,
   regardless of
-- the number of warehouses which had inventory move-
   ments for this partnum.

-- Create a new row in IBMSNAP_SUBS_COLS
INSERT INTO
ASN.IBMSNAP_SUBS_COLS(APPLY QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWU','MOVEMENT' ,'A',
'IBMSNAP_OPERATION','N', 4 ,'IBMSNAP_
   OPERATION');
-- IBMSNAP_OPERATION is carried over as a comment,
   for ease
-- of verifying the contents of the MOVEMENT table -- create a new row in IBMSNAP_SUBS_MEMBR
-- to fetch delete operations from the source CD table into
   view TRGVIEWD.MOVEMENT INSERT INTO ASN.IBMSNAP_SUBS_MEMBR(
APPLY_QUAL,SET_NAME,WHOS_ON_FIRST,
SOURCE_OWNER,SOURCE_TABLE,SOURCE_
   VIEW_QUAL,TARGET_OWNER,TARGE
T_TABLE,
TARGET_CONDENSED,TARGET_COMPLETE,
   TARGET_STRUCTURE,PREDICATES)
VALUES (
'APPLY_QUAL1' , 'SET_NAME2' , 'S' , 'GOLDRING'
   , 'INVENTORY' , 0 ,
'TRGVIEWD','MOVEMENT','A','N', 6 ,
'IBMSNAP_OPERATION="D" GROUP BY PARTNUM,
   IBMSNAP_OPERATION');
-- Note that this member just fetches the aggregated deletes.

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWD','MOVEMENT' ,'F',
'DIFFERENCE_WH','N', 1 ,'-COUNT(*)');
-- The count of warehouses is negated before going into the
-- MOVEMENT table, to be later subtracted from the
-- GOLDRING.AGGREGATES.COUNT_WH counter.

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWD','MOVEMENT' ,'A',
'PARTNUM','N', 2 ,'PARTNUM');

-- Create a new row in IBMSNAP_SUBS_COLS
INSERT INTO
ASN.IBMSNAP_SUBS_COLS(APPLY_QUAL,SET_
   NAME,WHOS_ON_FIRST,
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWD','MOVEMENT' ,'F',
'DIFFERENCE_QTY','N', 3 ,'-SUM(QTY)');
-- The quantity value is also negated before going into the
-- MOVEMENT table.

-- Create a new row in IBMSNAP_SUBS_COLS
INSERT INTO
ASN.IBMSNAP_SUBS_COLS(APPLY_QUAL,SET_
   NAME,WHOS_ON_FIRST,
```

```
TARGET_OWNER,TARGET_TABLE,COL_TYPE,
   TARGET_NAME,IS_KEY,COLNO,EXP
RESSION)
VALUES('APPLY_QUAL1','SET_NAME2' , 'S',
   'TRGVIEWD','MOVEMENT' ,'A',
'IBMSNAP_OPERATION','N', 4 ,'IBMSNAP_
   OPERATION');

-- the IBMSNAP_LLOGMARKER and IBMSNAP_
   HLOGMARKER columns will be
-- automatically maintained by the Apply process, represent-
   ing
-- the interval of the change aggregation
add an SQL-before statement to remove changes already
   applied to AGGREGATES
--
-- create a new row in IBMSNAP_SUBS_STMTS
INSERT INTO
ASN.IBMSNAP_SUBS_STMTS(APPLY_QUAL,SET_
   NAME,WHOS_ON_FIRST,
BEFORE_OR_AFTER,STMT_NUMBER,EI_OR_
   CALL,SQL_STMT,ACCEPT_SQLSTATES
)
VALUES('APPLY_QUAL1','SET_NAME2','S','B', 4
   ,'E','DELETE FROM
GOLDRING.MOVEMENT','0000002000');

-- add an SQL-after statement to compute adjust AGGRE-
   GATES for i/u/d to INVENTORY
--
-- create a new row in IBMSNAP_SUBS_STMTS
INSERT INTO
ASN.IBMSNAP_SUBS_STMTS(APPLY_QUAL,SET_
   NAME,WHOS_ON_FIRST,
BEFORE_OR_AFTER,STMT_NUMBER,EI_OR_
   CALL,SQL_STMT,ACCEPT_SQLSTATES
)
VALUES('APPLY_QUAL1','SET_NAME2','S','A', 5 ,
   'E',
'UPDATE GOLDRING.AGGREGATES A
SET COUNT_WH=A.COUNT_WH+(SELECT
   COALESCE(SUM(DIFFERENCE_WH),0)
FROM GOLDRING.MOVEMENT M
WHERE A.PARTNUM=M.PARTNUM),
SUM_QTY=A.SUM_QTY+(SELECT COALESCE(SUM
   (DIFFERENCE_QTY),0)
FROM GOLDRING.MOVEMENT M
WHERE A.PARTNUM=M.PARTNUM),
AVG_QTY=(A.SUM_QTY+(SELECT COALESCE
   (SUM(DIFFERENCE_QTY),0)
FROM GOLDRING.MOVEMENT M
WHERE A.PARTNUM=M.PARTNUM))/
(
CASE WHEN COUNT_WH+(SELECT COALESCE
   (SUM(DIFFERENCE_WH),0)
FROM GOLDRING.MOVEMENT M
WHERE A.PARTNUM=M.PARTNUM)=0 THEN 1
ELSE COUNT_WH+(SELECT COALESCE(SUM
   (DIFFERENCE_WH),0) FROM
GOLDRING.MOVEMENT M
WHERE A.PARTNUM=M.PARTNUM)
END
),
IBMSNAP_HLOGMARKER=COALESCE(
(SELECT MAX(IBMSNAP_HLOGMARKER)
FROM GOLDRING.MOVEMENT M),
IBMSNAP_HLOGMARKER)','0000002000');

--
-- The above UPDATE accounts for conditions when the
   MOVEMENT table is empty,
-- and also when the last partnum for a given warehouse is
   deleted
-- (avoiding division by zero when setting AVG_QTY).

-- The INSERT SQL-after statement adds rows when new
   part numbers are inventoried
--
-- create a new row in IBMSNAP_SUBS_STMTS
INSERT INTO
ASN.IBMSNAP_SUBS_STMTS(APPLY_QUAL,SET_
   NAME,WHOS_ON_FIRST,
BEFORE_OR_AFTER,STMT_NUMBER,EI_OR_
   CALL,SQL_STMT,ACCEPT_SQLSTATES
)
VALUES('APPLY_QUAL1','SET_NAME2','S','A', 6
   ,'E',
'INSERT INTO GOLDRING.AGGREGATES
(PARTNUM,COUNT_WH,SUM_QTY,AVG_QTY,
   IBMSNAP_LLOGMARKER,IBMSNAP_
HLOGMARKER)
SELECT  PARTNUM,DIFFERENCE_WH,
   DIFFERENCE_QTY,DIFFERENCE_QTY,
IBMSNAP_LLOGMARKER,IBMSNAP_
   HLOGMARKER
FROM GOLDRING.MOVEMENT M
WHERE NOT EXISTS
(SELECT * FROM GOLDRING.AGGREGATES E
   WHERE
E.PARTNUM=M.PARTNUM)','0000002000');
--
-- increment the AUX_STMTS counter in IBMSNAP_
   SUBS_SET
UPDATE ASN.IBMSNAP_SUBS_SET SET AUX_
   STMTS=AUX_STMTS +3 WHERE
APPLY_QUAL='APPLY_QUAL1' AND SET_NAME=
   'SET_NAME2' AND
WHOS ON FIRST='S';

COMMIT;
CONNECT TO SOURCE1;

--*
--* record the subscription in the pruning control table at the
--* source server
--*
INSERT INTO ASN.IBMSNAP_PRUNCNTL(
   TARGET_SERVER,TARGET_OWNER,
TARGET_TABLE,SOURCE_OWNER,SOURCE_
   TABLE,SOURCE_VIEW_QUAL,APPLY_
QUAL,
SET_NAME,CNTL_SERVER,TARGET_STRUCTURE,
   CNTL_ALIAS)VALUES('TARGET1',
'GOLDRING','AGGREGATES','GOLDRING',
   'INVENTORY', 0 ,'APPLY_QUAL1',
'SET_NAME1','TARGET1', 5 ,'TARGET1');
--*
--* record the subscription in the pruning control table at the
--* source server
--*
INSERT INTO ASN.IBMSNAP_PRUNCNTL
   ( TARGET_SERVER,TARGET_OWNER,
TARGET_TABLE,SOURCE_OWNER,SOURCE_
   TABLE,SOURCE_VIEW_QUAL,APPLY_
QUAL,
```

SET_NAME,CNTL_SERVER,TARGET_STRUCTURE,
CNTL_ALIAS)VALUES('TARGET1',
'TRGVIEWI','MOVEMENT','GOLDRING',
'INVENTORY', 0 ,'APPLY_QUAL1',
'SET_NAME2','TARGET1', 6 ,'TARGET1');

INSERT INTO ASN.IBMSNAP_PRUNCNTL
( TARGET_SERVER,TARGET_OWNER,
TARGET_TABLE,SOURCE_OWNER,SOURCE_
TABLE,SOURCE_VIEW QUAL,APPLY_
QUAL,
SET_NAME,CNTL_SERVER,TARGET_STRUCTURE,
CNTL_ALIAS)VALUES('TARGET1',
'TRGVIEWU','MOVEMENT','GOLDRING',
'INVENTORY', 0 ,'APPLY_QUAL1',
'SET_NAME2','TARGET1', 6 ,'TARGET1');

INSERT INTO ASN.IBMSNAP_PRUNCNTL
( TARGET_SERVER,TARGET_OWNER,
TARGET_TABLE,SOURCE_OWNER,SOURCE_
TABLE,SOURCE_VIEW_QUAL,APPLY_
QUAL,
SET_NAME,CNTL_SERVER,TARGET_STRUCTURE,
CNTL_ALIAS)VALUES('TARGET1',
'TRGVIEWD','MOVEMENT','GOLDRING',
'INVENTORY', 0 ,'APPLY_QUAL1',
'SET_NAME2','TARGET1', 6 ,'TARGET1');

COMMIT;

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a computer, the query being performed by a computer system to retrieve data from a dynamically increasing relational database stored in an electronic storage device coupled to the computer system, the method comprising the steps of:

(a) analyzing the query in the computer system to determine whether the query includes an aggregate operation; and (b) performing aggregate operations in the computer system, by incrementally aggregating only the newly inputted relational database data immediately into a base aggregates table, thereby updating the base aggregates table with the most current information without having to re-aggregate the relational database.

2. The method according to claim 1, wherein the aggregation operation comprises a grouping function.

3. The method according to claim 1, wherein the aggregation operation comprises one or more functions selected from a group comprising AVERAGE (AVG), COUNT and SUM functions.

4. The method according to claim 1, wherein the query having at least one arithmetically adjustable SQL column function, such as AVERAGE (AVG), COUNT and SUM, and other columns which are referenced in a GROUP BY clause.

5. The method according to claim 1, wherein:
   the computer system having at least a source site and a target site,
   the source site having the relational database and the target site having the base aggregates table, and
   the step (b) of incrementally performing aggregate operations being performed at the target site.

6. The method according to claim 1, wherein the base aggregates table including a row birth timestamp, set when a row is inserted into the base aggregate table, and an end timestamp, having a commit time of the last transaction modifying the base aggregate table.

7. The method according to claim 1, wherein the base aggregates table including a row birth timestamp, set when a row is inserted into the base aggregate table, and an end timestamp, having a commit time of the last transaction modifying the base aggregate table row.

8. The method according to claim 1, wherein the step (b) of incrementally performing aggregate operations including a step of coalescing duplicates to create a single aggregate result row for each result group in the base aggregate table.

9. An apparatus for optimizing a query, comprising:
   a computer system for retrieving data from a dynamically increasing relational database stored in an electronic storage device coupled to the computer system;
   means, performed by the computer, for analyzing the query in the computer system to determine whether the query includes an aggregate operation; and
   means, performed by the computer, for performing aggregate operations in the computer system, by incrementally aggregating only the newly inputted relational database data immediately into a base aggregates table, thereby updating the base aggregates table with the most current information without having to re-aggregate the relational database.

10. The apparatus according to claim 9, wherein the aggregation operation comprises a grouping function.

11. The apparatus according to claim 9, wherein the aggregation operation comprises one or more functions selected from a group comprising AVERAGE (AVG), COUNT and SUM functions.

12. The apparatus according to claim 9, wherein the query having at least one arithmetically adjustable SQL column function, such as AVERAGE (AVG), COUNT and SUM, and other columns which are referenced in a GROUP BY clause.

13. The apparatus according to claim 9, wherein:
   the computer system having at least a source site and a target site,
   the source site having the relational database and the target site having the base aggregates table, and
   the means for incrementally performing aggregate operations being performed at the target site.

14. The apparatus according to claim 9, wherein the base aggregates table including a row birth timestamp, set when a row is inserted into the base aggregate table, and an end timestamp, having a commit time of the last transaction modifying the base aggregate table.

15. The apparatus according to claim 9, wherein the base aggregates table including a row birth timestamp, set when a row is inserted into the base aggregate table, and an end timestamp, having a commit time of the last transaction modifying the base aggregate table row.

16. The apparatus according to claim 9, wherein the means for incrementally performing aggregate operations including means for coalescing duplicates to create a single aggregate result row for each result group in the base aggregate table.

17. A program storage device readable by a computer tangibly embodying a program of instructions executable by the computer to perform method steps for optimizing a query, the query being performed by the computer system to retrieve data from a dynamically increasing relational database stored in an electronic storage device coupled to the computer system, the method comprising the steps of:

(a) analyzing the query in the computer system to determine whether the query includes an aggregate operation; and (b) performing aggregate operations in the computer system, by incrementally aggregating only the newly inputted relational database data immediately into a base aggregates table, thereby updating the base aggregates table with the most current information without having to re-aggregate the relational database.

18. The method according to claim 17, wherein the aggregation operation comprises a grouping function.

19. The method according to claim 17, wherein the aggregation operation comprises one or more functions selected from a group comprising AVERAGE (AVG), COUNT and SUM functions.

20. The method according to claim 17, wherein the query having at least one arithmetically adjustable SQL column function, such as AVERAGE (AVG), COUNT and SUM, and other columns which are referenced in a GROUP BY clause.

21. The method according to claim 17, wherein:

the computer system having at least a source site and a target site, the source site having the relational database and the target site having the base aggregates table, and the step (b) of incrementally performing aggregate operations being performed at the target site.

22. The method according to claim 17, wherein the base aggregates table including a row birth timestamp, set when a row is inserted into the base aggregate table, and an end timestamp, having a commit time of the last transaction modifying the base aggregate table.

23. The method according to claim 17, wherein the base aggregates table including a row birth timestamp, set when a row is inserted into the base aggregate table, and an end timestamp, having a commit time of the last transaction modifying the base aggregate table row.

24. The method according to claim 17, wherein the step (b) of incrementally performing aggregate operations including a step of coalescing duplicates to create a single aggregate result row for each result group in the base aggregate table.

* * * * *